UNITED STATES PATENT OFFICE.

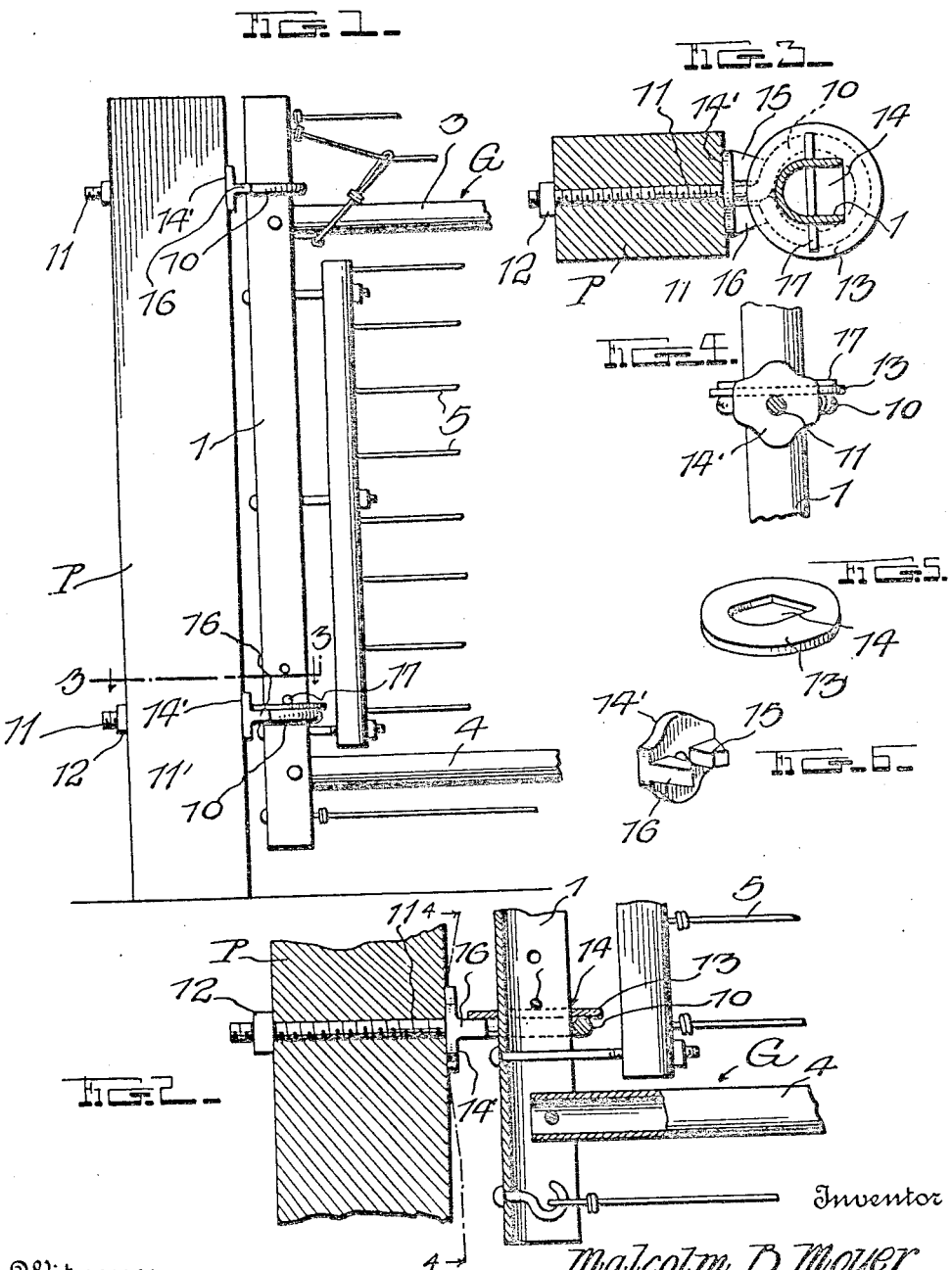

MALCOLM B. MOYER, OF MONTEVIDEO, MINNESOTA.

HINGE.

1,160,436.  Specification of Letters Patent.  Patented Nov. 16, 1915.

Application filed April 22, 1915. Serial No. 23,200.

*To all whom it may concern:*

Be it known that I, MALCOLM B. MOYER, a citizen of the United States, residing at Montevideo, in the county of Chippewa and State of Minnesota, have invented certain new and useful Improvements in Hinges; and I do declare the following to be a full, clear, and exact description of the invention, such as will enable others skilled in the art to which it appertains to make and use the same.

This invention relates to improvements in hinges and more particularly to gate hinges.

The object of the invention is to provide a simply constructed and efficient hinge of this character which will reliably support the weight of a gate with a minimum amount of friction and permit it to be readily turned and also to be raised or lowered as desired.

With this and other objects in view, the invention consists of certain novel features of construction, and the combination and arrangement of parts as will be more fully described and claimed.

In the accompanying drawing: Figure 1 represents a side elevation of a portion of a gate equipped with this improved hinge; Fig. 2 is a detail vertical section thereof; Fig. 3 is a transverse section taken on the line 3—3 of Fig. 1; Fig. 4 is a detail vertical section taken on the line 4—4 of Fig. 2; Fig. 5 is a detail perspective view of one washer; Fig. 6 is a similar view of the other washer.

The improved hinge contemplated by this invention is shown applied to a metal gate G having upright end members 1 and 2 connected by tubular cross bars 3 and 4 disposed at the top and bottom thereof and having wire netting 5 arranged between them and connected thereto in any suitable manner.

The hinge constituting this invention comprises an encircling band 10 adapted to encircle the upright 1 at the rear of the gate at a point near its lower end and which has a laterally extending shank 11 adapted to be engaged with a post P disposed for supporting the hinged end of the gate. This shank 11 extends through the post P and is secured thereto in any suitable manner, a nut 12 being here shown engaged with its free outer end. A washer 13 is shown mounted on the upright 1 with the aperture 14 thereof conforming to the cross sectional contour of said upright, said upright being here shown in the form of a bar U-shaped in cross section. Another washer 14' is shown mounted on the shank 11 of the band 10 and is provided with curved laterally extending arms 15 and 16 which are adapted to engage the outer face of the band 10 on opposite sides of the shank 11, which holds the end of said band in position and presents a flat bearing surface for the washer 13, said arms 15 and 16 being of a width equal to the width of the band 10 as shown in Fig. 2, and on the upper edges of which said washer 13 is designed to rest. A heavy pin 17 extends through the upright 1 at a point above the washer and said pin is designed to rest on said washer 13 which latter forms a bearing for the pin during the opening and closing of the gate, said pin riding over the washer and supporting the weight of the gate.

The auxiliary washer 14' is designed for properly spacing the gate from the post and for preventing the band 10 from uncoiling, said band being shown with one free end which is held against spreading or opening by the arms 15 and 16. These arms engage said band on opposite sides of its shank (see Fig. 3).

From the above description the operation of this improved hinge will be obvious without a more detailed explanation thereof and while simple in construction it forms a very efficacious connecting hinge for metal gates.

I claim as my invention;—

1. A hinge comprising an encircling band having a support engaging member, means for engaging said band to hold it in operative position, and a washer adapted to rest on said band and said means.

2. A hinge comprising an encircling band having a laterally extending support engaging shank, a member having arms engaging said band to hold it in operative position, and a washer resting on said band and arms.

3. The combination with a gate having an upright, of a band encircling said upright and provided with a laterally extending post engaging shank, a washer mounted on said shank and having curved arms engaging said band on opposite sides of its shank, said arms being of a width corresponding to the width of the band, a washer encircling said upright and resting on the upper edges of said band and arms, and a pin extending through said upright and bearing on said washer.

In testimony whereof I have hereunto set my hand in presence of two subscribing witnesses.

MALCOLM B. MOYER.

Witnesses:
M. C. GRUND,
G. W. GIOVANNETTI.

Copies of this patent may be obtained for five cents each, by addressing the "Commissioner of Patents, Washington, D. C."